United States Patent
Arroyo et al.

(10) Patent No.: US 9,501,308 B2
(45) Date of Patent: *Nov. 22, 2016

(54) IMPLEMENTING COHERENT ACCELERATOR FUNCTION ISOLATION FOR VIRTUALIZATION

(71) Applicant: International Business Machines Corporation, Armonk, NY (US)

(72) Inventors: Jesse P. Arroyo, Rochester, MN (US); Srinivas Kotta, Hyderabad (IN); Gregory M. Nordstrom, Pine Island, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/628,195

(22) Filed: Feb. 20, 2015

(65) Prior Publication Data
US 2015/0317275 A1    Nov. 5, 2015

Related U.S. Application Data

(63) Continuation of application No. 14/269,338, filed on May 5, 2014.

(51) Int. Cl.
*G06F 9/455* (2006.01)
*G06F 13/40* (2006.01)
(Continued)

(52) U.S. Cl.
CPC ....... *G06F 9/45558* (2013.01); *G06F 12/0815* (2013.01); *G06F 13/4027* (2013.01);
(Continued)

(58) Field of Classification Search
CPC .. G06F 3/0662; G06F 3/0664; G06F 9/3877; G06F 9/45558; G06F 2009/45579; G06F 9/5061; G06F 9/5077; G06F 11/0712; G06F 13/4027; G06F 12/0815; G06F 11/0793; G06F 11/0745; G06F 2212/282
See application file for complete search history.

(56) References Cited

U.S. PATENT DOCUMENTS 7,134,052 B2   11/2006  Bailey et al.
7,398,427 B2    7/2008  Arndt et al.
(Continued)

FOREIGN PATENT DOCUMENTS

| EP | 1923793 A2 | 5/2008 |
|---|---|---|
| WO | 2013147881 A1 | 10/2013 |
| WO | 2013159288 A1 | 10/2013 |

OTHER PUBLICATIONS

International Search Report and Written Opinion of the ISA dated Sep. 11, 2015—International Application No. PCT/IB2015/053069.
(Continued)

*Primary Examiner* — Thomas J Cleary
(74) *Attorney, Agent, or Firm* — Jay Wahlquist

(57) ABSTRACT

A method, system and computer program product are provided for implementing coherent accelerator function isolation for virtualization in an input/output (IO) adapter in a computer system. A coherent accelerator provides accelerator function units (AFUs), each AFU is adapted to operate independently of the other AFUs to perform a computing task that can be implemented within application software on a processor. The AFU has access to system memory bound to the application software and is adapted to make copies of that memory within AFU memory-cache in the AFU. As part of this memory coherency domain, each of the AFU memory-cache and processor memory-cache is adapted to be aware of changes to data commonly in either cache as well as data changed in memory of which the respective cache contains a copy.

9 Claims, 9 Drawing Sheets

(51) Int. Cl.
 *G06F 12/08* (2016.01)
 *G06F 11/07* (2006.01)
(52) U.S. Cl.
 CPC ........ *G06F11/0712* (2013.01); *G06F 11/0745* (2013.01); *G06F 11/0793* (2013.01); *G06F 2009/45579* (2013.01); *G06F 2212/282* (2013.01)

(56) References Cited

U.S. PATENT DOCUMENTS

| | | | |
|---|---|---|---|
| 8,082,418 B2 | 12/2011 | Stillwell, Jr. et al. | |
| 8,386,679 B2 | 2/2013 | Nordstrom et al. | |
| 8,392,824 B2 | 3/2013 | Behrens et al. | |
| 8,738,860 B1* | 5/2014 | Griffin | G06F 12/0897 711/122 |
| 2007/0157211 A1 | 7/2007 | Wang et al. | |
| 2007/0226424 A1* | 9/2007 | Clark | G06F 12/0817 711/141 |
| 2011/0072234 A1* | 3/2011 | Chinya | G06F 12/1027 711/207 |
| 2011/0161620 A1* | 6/2011 | Kaminski | G06F 12/1009 711/207 |
| 2011/0295967 A1 | 12/2011 | Wang et al. | |
| 2012/0284446 A1* | 11/2012 | Biran | G06F 13/36 710/306 |
| 2013/0061020 A1* | 3/2013 | Koob | G06F 13/28 711/202 |
| 2013/0238860 A1 | 9/2013 | Archer et al. | |
| 2014/0122560 A1* | 5/2014 | Ramey | G06F 15/17312 709/201 |
| 2014/0237185 A1* | 8/2014 | Solihin | G06F 12/0811 711/119 |
| 2015/0220354 A1* | 8/2015 | Nair | G06F 12/10 710/301 |

OTHER PUBLICATIONS

O. Callanan et al., "A Study in Rapid Prototyping: Leveraging Software and Hardware Simulation Tools in the Bring up of System-on-a-Chip Based Platforms", IEEE, pp. 45-52 (2011).

* cited by examiner

300

| FEATURES 302 | EXISTING ART | BASE SOLUTION 100 | ENHANCED SOLUTION 200 |
|---|---|---|---|
| ENDPOINT FUNCTIONS 304 | ONE | ONE | ONE |
| CONFIG SPACE REGIONS 306 | ONE | ONE | ONE |
| ADDITIONAL PCIE RIDs 308 | ZERO | ZERO | ONE PER AFU |
| ADAPTER PEs 310 | ONE | ONE | ONE |
| AFU PEs 312 | ZERO | ONE | ONE PER AFU |
| ERROR RECOVERY 314 | NOT POSSIBLE (HOST OS REBOOT REQUIRED) | POSSIBLE (ALL HOST OS INSTANCES IMPACTED) | IMPROVED (FINER GRAIN, SINGLE HOST OS IMPACT WHERE POSSIBLE) |

| BASIC SOLUTION 100 | | | |
|---|---|---|---|
| TRAFFIC TYPE 402 | PE USED 404 | ERROR ACTION 406 | ERROR IMPACT 408 |
| MMIO INITIATED BY HYPERVISOR ADAPTER DRIVER | ADAPTER PE | FREEZES ADAPTER PE PLUS AFU PE | HYPERVISOR ADAPTER DRIVER AND ALL HOST OS INSTANCES |
| MMIO INITIATED BY HOST OS TO AFU n | AFU PE | FREEZES AFU PE | ALL HOST OS INSTANCES |
| DMA INITIATED BY ADAPTER PSL | ADAPTER PE | FREEZES ADAPTER PE AND AFU PE | HYPERVISOR ADAPTER DRIVER AND ALL HOST OS INSTANCES |
| DMA INITIATED BY AFU n | ADAPTER PE | FREEZES ADAPTER PE AND AFU PE | HYPERVISOR ADAPTER DRIVER AND ALL HOST OS INSTANCES |

FIG. 4

| ENHANCED SOLUTION 200 | | | |
|---|---|---|---|
| TRAFFIC TYPE 502 | PE USED 504 | ERROR ACTION 506 | ERROR IMPACT 508 |
| MMIO INITIATED BY HYPERVISOR ADAPTER DRIVER | ADAPTER PE | FREEZES ADAPTER PE PLUS AFU PEs | HYPERVISOR ADAPTER DRIVER AND ALL HOST OS INSTANCES |
| MMIO INITIATED BY HOST OS TO AFU n | AFU PE n | FREEZES AFU PE n | SINGLE HOST OS INSTANCE |
| DMA INITIATED BY ADAPTER PSL | ADAPTER PE | FREEZES ADAPTER PE AND AFU PEs | HYPERVISOR ADAPTER DRIVER AND ALL HOST OS INSTANCES |
| DMA INITIATED BY AFU n | AFU PE n | FREEZES AFU PE n | SINGLE HOST OS INSTANCES |

IMPLEMENTING COHERENT ACCELERATOR FUNCTION ISOLATION FOR VIRTUALIZATION

This application is a continuation application of Ser. No. 14/269,388 filed May 5, 2014.

FIELD OF THE INVENTION

The present invention relates generally to the data processing field, and more particularly, relates to a method, system and computer program product for implementing coherent accelerator function isolation for virtualization in an input/output (IO) adapter in a computer system.

DESCRIPTION OF THE RELATED ART

Coherent accelerators may be utilized within the scope of a single operating system image, whether that operating system (OS) is one of a plurality on a logically partitioned server, or the sole operating system of a non-partitioned system. However, it is desirable to enable a coherent accelerator to be shared, or virtualized, across a plurality of operating system images on a logically partitioned system. A fundamental requirement to enable sharing is that Peripheral Component Interconnect Express (PCIE or PCI-Express) transactions, including for example, direct memory accesses (DMAs), message signaled interrupts, memory-mapped Input/Output (IO), and error events, be isolated between OS images and accelerator functions.

PCI-Express (PCIE) enables virtualizing sub-functions of a PCIE device using Single Root IO Virtualization (SRIOV). Single root input/output (IO) virtualization (SRIOV) is a PCI standard, providing an adapter technology building block for I/O virtualization within the PCI-Express (PCIe) industry. The SRIOV architecture encapsulates resources within a PCI-Express IO adapter behind a Virtual Function (VF) that in many respects operates as a conventional PCI-Express device. Isolation of VFs from each other and operating system images other than those to which the VFs are individually assigned is accomplished by use of translation tables, such as Hardware Page Tables that translate processor instruction addresses to PCI-Express memory addresses or memory-mapped I/O (MMIO) and DMA translation tables that translate PCI-Express device memory read/write addresses to system memory addresses.

Utilizing either conventional PCI or SRIOV devices, MMIO and DMA domains are associated with a PCI function having a bus/device/function (requester ID, or RID) association. Additionally, DMA translation may include Message Signaled Interrupt (MSI), (DMA write) isolation, by an OS or hypervisor authorizing a particular set of MSI vectors to particular MSI or DMA addresses. For example, IBM POWER systems IO Device Architecture, (IODA) for PCI-Express, as well as Intel VT-D architecture, exemplify these techniques.

IBM POWER systems IODA provides a means to associate MMIO, DMA, and MSI addresses with a RID to facilitate isolating errors involving MMIO, DMA, or MSI transactions on the PCI-Express bus to a particular PCI-Express function, utilizing the RID and tables within POWER PCI-Express root complexes or PCI-Express host bridges (PHBs). Within the art it is understood that a PCI host bridge (PHB) is an element within a PCI root complex, and may in a particular design be in whole an instance of a root complex.

However, aspects of SRIOV complicate the design of a coherent accelerator function, or may not be compatible with the accelerator operation. For example, units within a processor communicate with an accelerator to synchronize the state of memory cache lines that may be held in common in the accelerator itself. While this communication may use PCI-Express memory read/write transactions, to communicate cache line updates, or to retrieve changed cache lines from an accelerator, the references to cache lines using PCI-Express memory read/write transactions may be structured in terms of system memory, and have no ability to relate these directly to SRIOV type virtual functions. (VFs).

A need exists for an effective method and apparatus to achieve coherent accelerator function isolation for virtualization, such as to achieve isolation of MMIO, DMA, MSI, and errors at a PCI-Express transaction level, without requiring the use of other PCI-Express virtualization mechanisms, such as SRIOV. A need exists to reduce complexity in the design of the processor and accelerator to enable use of simple PCI-Express memory read/write transactions by either of them, without introducing additional and unnecessary concepts of SRIOV.

SUMMARY OF THE INVENTION

Principal aspects of the present invention are to provide a method, system and computer program product for implementing coherent accelerator function isolation for virtualization. Other important aspects of the present invention are to provide such method, system and computer program product substantially without negative effects and that overcome many of the disadvantages of prior art arrangements.

In brief, a method, system and computer program product are provided for implementing coherent accelerator function isolation for virtualization in an input/output (IO) adapter in a computer system. A coherent accelerator provides accelerator function units (AFUs), each AFU is adapted to operate independent of the other AFUs to perform a computing task that can be implemented within application software on a processor. The AFU has access to system memory bound to the application software and is adapted to make copies of that memory within AFU memory-cache in the AFU. As part of this memory coherency domain, each of the AFU memory-cache and processor memory-cache is adapted to be aware of changes to data commonly in either AFU memory-cache or processor memory-cache as well as data changed in memory of which the respective cache contains a copy.

In accordance with features of the invention, to maintain synchronization between the AFU memory-cache and the processor memory-cache, the processor and accelerator communicate changes to individual memory regions, for example represented as cache lines.

In accordance with features of the invention, use of simple PCI-Express memory read/write transactions by the processor and the accelerator is enabled when using a PCI-Express interconnect, with design complexity of the processor and the accelerator advantageously reduced, without requiring additional and unnecessary concepts of SRIOV. A coherent accelerator utilizes a PCI Services Layer (PSL) endpoint function within the adapter to effect PCI transactions associated with the AFUs In accordance with features of the invention, a hypervisor adapter driver in support of a PCI-Express interface associates each AFU with PCI host bridge (PHB) isolation facilities.

In accordance with features of the invention, when using PCI-Express interconnect between each AFU and a processor and memory, the processor and AFU utilize PCI-Express memory read/write operations. An AFU is associated with a PCI-Express requester ID (RID) for identifying that AFU during the PCI-Express memory read/write operations effecting AFU DMA to or from system memory. An AFU is associated with a RID for purposes of a PHB associating processor MMIO addresses with an AFU.

In accordance with features of the invention, requests to perform a task and result of completing that task are exchanged between an application running within an operating system (OS) and the AFU using command/response queues within system memory, the AFU, or a combination of both. The individual AFUs either respond to or originate PCI-Express memory cycles, and the accelerator adapter PSL performs the PCI-Express transactions corresponding to those memory read/write operations.

In accordance with features of the invention, the AFUs are recognized and operated by an operating system (OS) as particular types of memory-mapped AFU devices and optionally in a manner in which they are completely unassociated with PCI-Express buses or functions, within the operating system.

In accordance with features of the invention, a PCI-Express PHB optionally is used to associate Memory-mapped IO (MMIO), Direct Memory Access (DMA), Message Signaled Interrupt (MSI) address ranges with PCI-Express RIDs (Relative Identifiers) to associate these address ranges with individual accelerator function unit (AFU) that are not otherwise configured and operate on the PCI-Express bus as endpoint functions.

In accordance with features of the invention, a hypervisor or other system configuration and management software or firmware in support of PCI-Express buses and managing the coherent accelerator as a whole detects and recovers error involving the PSL or AFUs, without requiring the termination of any one OS to restore operation of its respective AFU, with the AFUs sharing a common PSL endpoint function on the PCI-Express bus.

In accordance with features of the invention, a hypervisor or other system configuration and management software or firmware in support of PCI-Express buses associates AFUs with PHB isolation facilities.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 illustrates example operational features for implementing coherent accelerator function isolation for virtualization in an input/output (IO) adapter of FIG. 1 and FIG. 2 with comparison of existing art in accordance with preferred embodiments;

FIG. 4 illustrates example operational features for implementing coherent accelerator function isolation for virtualization in an input/output (IO) adapter of FIG. 1 in accordance with preferred embodiments;

FIG. 5 illustrates example operational features for implementing coherent accelerator function isolation for virtualization in an input/output (IO) adapter of FIG. 2 in accordance with preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing coherent accelerator function isolation for virtualization in an input/output (IO) adapter.

Figure 1:
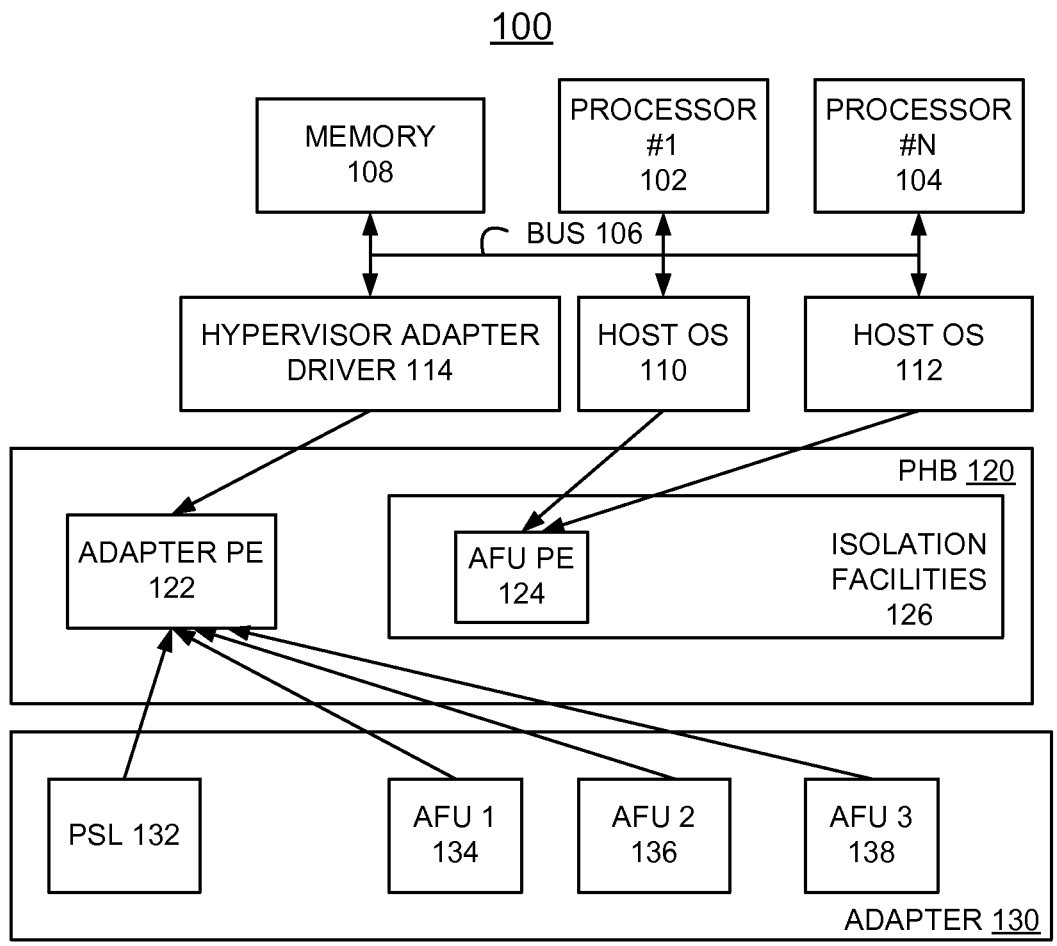
FIG. 1 illustrates an example system for implementing coherent accelerator function isolation for virtualization in an input/output (IO) adapter with a single BDF (bus/device/function) in accordance with a preferred embodiment.

Having reference now to the drawings, in FIG. 1, there is shown an example computer system generally designated by the reference character 100 for implementing coherent accelerator function isolation for virtualization in an input/output (IO) adapter in accordance with the preferred embodiment. Computer system 100 includes one or more processors, such as processor #1, 102 through processor #N, 104 or central processor units (CPUs) 102, 104 coupled by a system bus 106 to a memory 108, a respective host operating system (OS) 110, 112, and a hypervisor adapter driver 114. The hypervisor adapter driver 114 is a part of the system firmware and manages the allocation of resources to each operating system 110, 112.

Computer system 100 can be utilized within the scope of a single operating system image, whether that operating system (OS) is one of a plurality on a logically partitioned server, or the sole operating system of a non-partitioned system. Computer system 100 enables a coherent accelerator to be shared, or virtualized, across a plurality of operating system (OS) images on a logically partitioned system.

Computer system 100 includes an I/O hub, processor host bridge or PCIE host bridge (PHB) 120 providing coherent accelerator PE (Partitionable Endpoint) support in accordance with the preferred embodiment. PHB 120 includes an adapter PE 122 coupled to the hypervisor adapter driver 114, and an AFU PE 124 coupled to each respective host operating system (OS) 110, 112. PHB 120 includes isolation facilities 126 provided with AFU PE 124.

Computer system 100 includes an Input/Output (I/O) adapter 130 providing a coherent accelerator with transaction layer functions including for example, a PCI Services Layer (PSL) 132, and a plurality of AFUs 1-3, 134, 136, 138, with the PSL 132, and each AFUs 1-3, 134, 136, 138 coupled to the adapter PE 122. AFUs 1-3, 134, 136, 138 are logic units within the accelerator that perform specific application tasks.

In accordance with features of the invention, isolation facilities 126 within the PCI-Express PHB 120 are used particularly including error isolation without requiring the use of a PCI-Express endpoint function. Methods of the invention detect and recover from PCI-Express error conditions involving individual AFUs, the AFUs as a collective, and the PSL. The operating system and application are enabled to continue to function through interacting with the error recovery methods, so that a reboot of the operating system is not required, and so that individual operating systems may individually recover operation of their respective AFUs even though the accelerator device is shared at a single PCI-Express endpoint function.

In a particular embodiment requests to perform a task and result of completing that task are exchanged between the application running within OS 110, or OS 112 and the respective AFUs 1-3, 134, 136, 138 using command/response queues within system memory 108, the AFU, or a combination of both. Each of the individual AFUs 1-3, 134, 136, 138 either respond to or originate PCI-Express memory cycles, and the PSL 132 performs the PCI-Express transactions corresponding to those memory read/write operations. However, the AFUs 1-3, 134, 136, 138 are not themselves PCI-Express endpoint devices or functions and may not be recognized by an operating system as PCI-Express devices. Instead, the AFUs are recognized and operated by OS 110, or OS 112 as particular types of memory-mapped AFU devices and possibly in a manner in which they are completely unassociated with PCI-Express buses or functions, within the respective operating system.

Computer system 100 enables coherent accelerator adapter functionality with the additional AFU PE 124 that is associated with all AFUs 1-3, 134, 136, 138, collectively. Host OS MMIO activities are governed by the AFU PE 124. The AFU PE 124 can be frozen such that the host OSs 110, 112 are blocked from accessing the adapter 130. The AFU PE 124 allows the hypervisor 114 to complete recovery or maintenance actions without the possibility of a host OS user impacting the adapter 130. Transactions of adapter 130, both those associated with the PSL 132 as well those associated with the AFUs -3, 134, 136, 138, utilize the adapter PE 122. Any failure from the adapter PE 122 still impacts all OS partitions using the coherent accelerator adapter 130.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
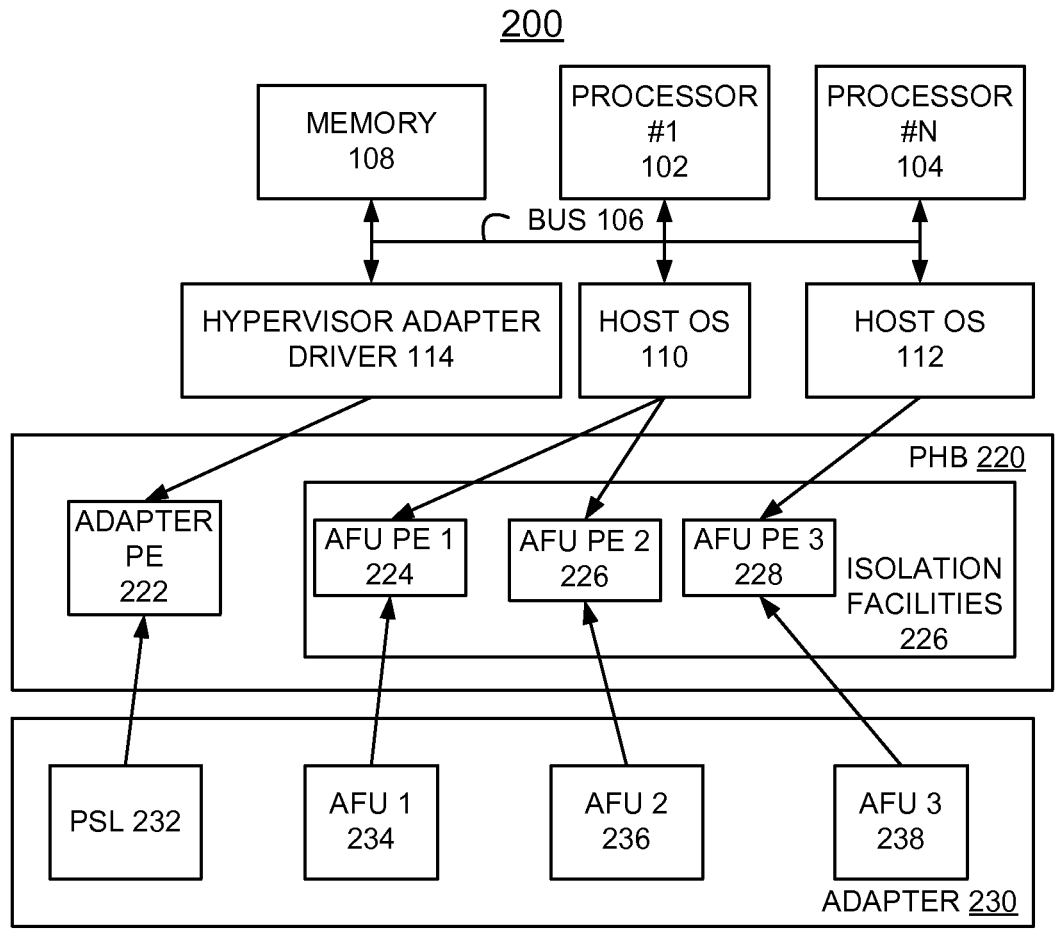
FIG. 2 illustrates another example system for implementing enhanced coherent accelerator function isolation for virtualization in an input/output (IO) adapter with multiple BDFs in accordance with a preferred embodiment.

Referring to FIG. 2, there is shown another example system generally designated by the reference character 200 for implementing coherent accelerator function isolation for virtualization in an input/output (IO) adapter 230 with multiple BDFs in accordance with a preferred embodiment. Computer system 200 similarly includes one or more processors, such as processor #1, 102 through processor #N, 104 or central processor units (CPUs) 102, 104 coupled by a system bus 106 to a memory 108, a respective host operating system (OS) 110, 112, and a hypervisor adapter driver 114.

Computer system 200 includes an I/O hub, processor host bridge or PCIE host bridge (PHB) 220 providing coherent accelerator PE (Partitionable Endpoint) support in accordance with the preferred embodiment. PHB 220 includes an adapter PE 222 coupled to the hypervisor adapter driver 114, and a plurality of AFU PE 1-3, 224, 226, 228 with AFU PE 1-2, 224, 226 coupled to host OS 110 and AFU PE 3, 228 coupled to host OS 112, as shown. PHB 220 includes isolation facilities 226 provided with AFU PE 1-3, 224, 226, 228.

Computer system 200 includes an Input/Output (I/O) adapter 230 providing a coherent accelerator with transaction layer functions including for example, a PCI Services Layer (PSL) 232 providing all functions and facilities consistent with a PCIE endpoint function, and a plurality of AFUs 1-3, 234, 236, 238, with the PSL 232 coupled to the adapter PE 222, and each AFUs 1-3, 234, 236, 238 coupled to a respective AFU PE 1-3, 224, 226, 228.

Computer system 200 enables coherent accelerator adapter enhanced functionality with the additional AFU PEs 1-3, 224, 226, 228, each associated with the respective AFUs 1-3, 234, 236, 238. When the adapter 230 does DMA transactions it encodes the respective one of AFUs 1-3, 234, 236, 238 performing the transaction, for example, using Alternative Routing-ID Interpretation (ARI) techniques into the DMA packets. This allows for fault isolation down to a single one of AFUs 1-3, 234, 236, 238 while still only implementing a single PCI function with a single configuration space. This is an increasingly important and valuable feature as the number of AFUs on an adapter 230 increases.

Host OS MMIO activities are governed by the respective AFU PEs 1-3, 224, 226, 228. Each respective AFU PEs 1-3, 224, 226, 228 advantageously can be frozen such that the host OSs 110, 112 are blocked from accessing the adapter 230. Each of the respective AFU PEs 1-3, 224, 226, 228 allows the hypervisor 114 to complete recovery or maintenance actions without the possibility of a host OS user impacting the adapter 230. Transactions associated with the PSL 232 of adapter 230 utilize the adapter PE 222. Any failure from the adapter PE 222 still impacts all OS partitions using the coherent accelerator adapter 230.

In accordance with features of the invention, PCI-Express PHB 120 apparatus is used to associate Memory-mapped IO (MMIO), Direct Memory Access (DMA), Message Signaled Interrupt (MSI) address ranges with PCI-Express RIDs (Relative Identifier) to associate these address ranges with each of the individual Accelerator function units AFUs 1-3, 234, 236, 238 that are not otherwise configured and operate on the PCI-Express bus as endpoint functions.

In accordance with features of the invention, the hypervisor adapter driver 114 in support of a PCI-Express interface associates each of the AFUs 1-3, 234, 236, 238 with PHB isolation facilities 226. The hypervisor adapter driver 114, managing the coherent accelerator as a whole, detects and recovers error involving the PSL 232 or AFUs 1-3, 234, 236, 238, without requiring the termination of any one OS 110, 112 to restore operation of its respective AFU, with the AFUs sharing a common PCI Services Layer (PSL) endpoint function on the PCI-Express bus. The hypervisor adapter driver 114 in support of PCI-Express buses associates AFUs with PHB isolation facilities 226.

In accordance with features of the invention, the PSL 232 of a coherent accelerator RID is associated with the MMIO, DMA, MSI, and error state facilities 226 of a PCI-Express PHB 220, and the PCI-Express RID is associated with a collective of AFUs AFUs 1-3, 234, 236, 238 and further associating AFUs 1-3, 234, 236, 238 residing behind the respective PSL 232 with the PCI-Express PHB 220 without the AFU RID being itself an individual PCI-Express endpoint or SRIOV virtual functions and having all the facilities and behaviors of such functions.

In accordance with features of the invention, when using PCI-Express interconnect between each AFU of AFUs 1-3, 234, 236, 238 and processor 102, 104 and memory 108, the processor and AFU utilize PCI-Express memory read/write operations. An AFU of AFUs 1-3, 234, 236, 238 is associated with a PCI-Express requester ID (RID) for identifying that AFU during the PCI-Express memory read/write operations.

Referring to FIG. 3, there are shown example operational features generally designated by the reference character 300 for implementing coherent accelerator function isolation for virtualization in the input/output (IO) adapter 130 in system 100 of FIG. 1 and input/output (IO) adapter 230 in system 200 of FIG. 2 with comparison of existing art in accordance with preferred embodiments, without relying upon facilities or operations of PCIE SRIOV.

Multiple features 302 are shown for comparison of known existing art, with IO adapter 130 in system 100 of FIG. 1 and IO adapter 230 in system 200 of FIG. 2. One endpoint function 304 is included in the known existing art, IO adapter 130 in system 100 and IO adapter 230 in system 200. A single configuration space region 306 is included in the known existing art, IO adapter 130 in system 100 and IO adapter 230 in system 200. An additional PCIE RID 308 is included in the IO adapter 230 in system 200, with zero included in the known existing art, and in the IO adapter 130 in system 100. A single adapter PE 310 is included in the known existing art, IO adapter 130 in system 100 and IO adapter 230 in system 200. One AFU PE 312 is included in the IO adapter 130 in system 100 and one AFU PE 312 per AFU is included in the IO adapter 230 in system 200, with zero AFU PE 312 included in the known existing art. Error recovery 314 is not possible in the known existing art with the host OS reboot required. Error recovery 314 is possible in the IO adapter 130 in system 100 with all host OS instances impacted. Improved error recovery 314 is possible in the IO adapter 230 in system 200 with a finer grain and a single host OS instances impacted.

Referring to FIG. 4, there are shown example operational features generally designated by the reference character 400 for implementing coherent accelerator function isolation for virtualization in an input/output (IO) adapter 130 in system 100 of FIG. 1 in accordance with preferred embodiments without relying upon facilities or operations of PCIE SRIOV. Multiple traffic types 402 are shown with a respective PE used 404, error action 406, and error impact 408. With traffic type 402 of MMIO initiated by the hypervisor adapter driver, the PE used 404 is the adapter PE, error action 406 causes the PHB isolation facilities 126 to freeze adapter PE plus AFU PE, and the error impact 408 includes the hypervisor adapter driver and all host OS instances. With traffic type 402 of MMIO initiated by the host OS to a particular AFU n, the PE used 404 is the AFU PE, error action 406 causes the PHB isolation facilities 126 to freeze the AFU PEs, and the error impact 408 includes all host OS instances. With traffic type 402 of DMA initiated by adapter PSL, the PE used 404 is the adapter PE, error action 406 causes the PHB isolation facilities 126 to freeze the adapter PE and the AFU PE, and the error impact 408 includes the hypervisor adapter driver and all host OS instances. With traffic type 402 of DMA initiated by a particular AFU n, the PE used 404 is the adapter PE, error 406 freezes the adapter PE and the AFU PE, and the error impact 408 includes the hypervisor adapter driver and all host OS instances.

Referring to FIG. 5, there are shown example operational features generally designated by the reference character 500 for implementing coherent accelerator function isolation for virtualization in an input/output (IO) adapter 230 in system 200 of FIG. 2 in accordance with preferred embodiments. Multiple traffic types 502 are shown with a respective PE used 504, error action 506, and error impact 508. With traffic type 502 of MMIO initiated by the hypervisor adapter driver, the PE used 504 is the adapter PE, error action 506 causes the PHB isolation facilities 226 to freeze adapter PE plus AFU PEs, and the error impact 508 includes the hypervisor adapter driver and all host OS instances. With traffic type 502 of MMIO initiated by the host OS to a particular AFU n, the PE used 504 is the particular AFU PE n, error action 506 causes the PHB isolation facilities 226 to freeze the AFU PE n, and the error impact 508 includes the single host OS instances. With traffic type 502 of DMA initiated by adapter PSL, the PE used 504 is the adapter PE, error action 506 causes the PHB isolation facilities 226 to freeze the adapter PE and the AFU PEs, and the error impact 508 includes the hypervisor adapter driver and all host OS instances. With traffic type 502 of DMA initiated by a particular AFU n, the PE used 504 is the AFU PE n, error action 506 causes the PHB isolation facilities 226 to freeze the AFU PE n, and the error impact 508 includes a single host OS instances.

Figure 6:
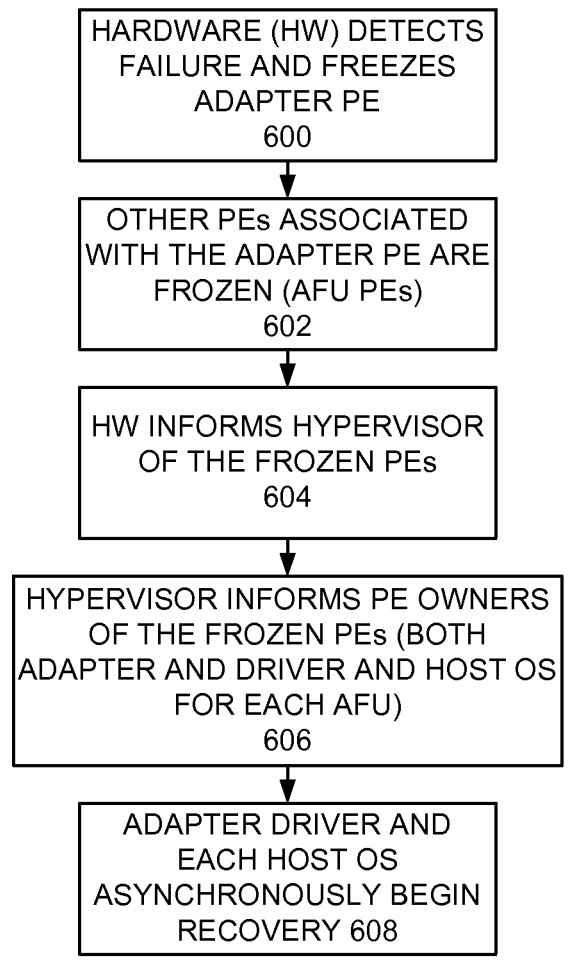
FIGS. 6, 7, and 8 are flow charts illustrating example system operations of the systems of FIGS. 1 and 2 for implementing coherent accelerator function isolation in accordance with preferred embodiments.
Figure 7:
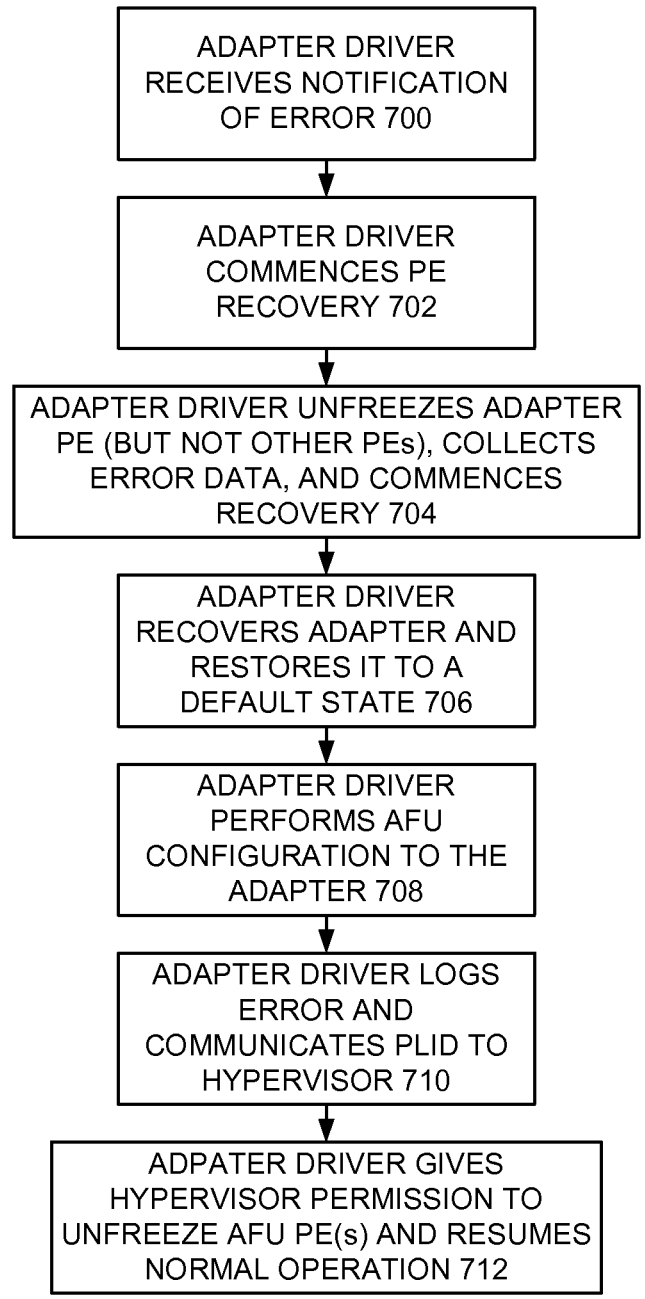
Figure 8:
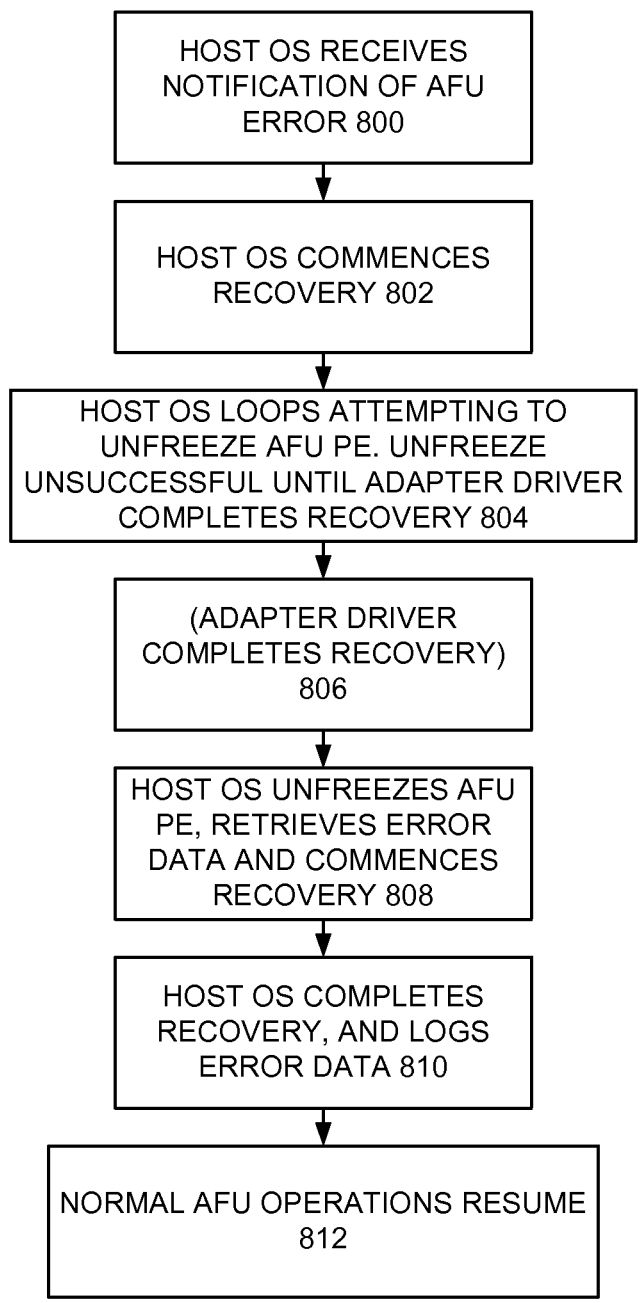

FIGS. 6, 7, and 8 are flow charts illustrating example system operations of the systems of FIGS. 1 and 2 for implementing coherent accelerator function isolation in accordance with preferred embodiments.

Referring to FIG. 6, there are shown example high level system operations of the systems of FIGS. 1 and 2 starting with PHB or root complex hardware or hypervisor adapter driver detects failure and freezes the adapter PE as indicated in a block 600. As indicated in a block 602, other PEs associated with the adapter PE are frozen including all AFU PEs. In the event that the PHB hardware detects the failure the hardware informs hypervisor of the frozen PEs as indicated in a block 604. The hypervisor informs PE owners of the frozen PEs including both adapter driver and host OS for each AFU as indicated in a block 606. The adapter driver and each host OS asynchronously begin recovery as indicated in a block 608.

Referring also to FIG. 7, there are shown example hypervisor driver operations of the systems of FIGS. 1 and 2 starting when the adapter driver receives notification of error as indicated in a block 700. The adapter driver commences PE recovery as indicated in a block 702. The adapter driver unfreezes the adapter PE with other PEs remaining frozen, collects error data, and commences recover as indicated in a block 704. The adapter driver recovers the adapter and restores the adapter to a default state as indicated in a block 706. The adapter driver performs AFU configuration to the adapter as indicated in a block 708. The adapter driver logs error and communicates a PCI error log identifier (PLID) for the error logged by the adapter driver to the hypervisor as indicated in a block 710. The adapter drives gives the hypervisor permission to unfreeze AFU PE(s) and resumes normal operation as indicated in a block 712.

Referring to FIG. 8, there are shown example host OS operations of the systems of FIGS. 1 and 2 starting with host OS receives notification of AFU error as indicated in a block 800. The host OS commences recovery as indicated in a block 802. The host OS loops attempting to unfreeze AFU PE, and the unfreeze is unsuccessful until the adapter driver completes recovery as indicated in a block 804. As indicated in a block 806, the adapter driver completes recovery. Then the host OS unfreezes the AFU PE, retrieves error data and commences recovery as indicated in a block 808. The host OS completes recovery, and logs error data as indicated in a block 810. Normal AFU operations resume as indicated in a block 812.

Figure 9:
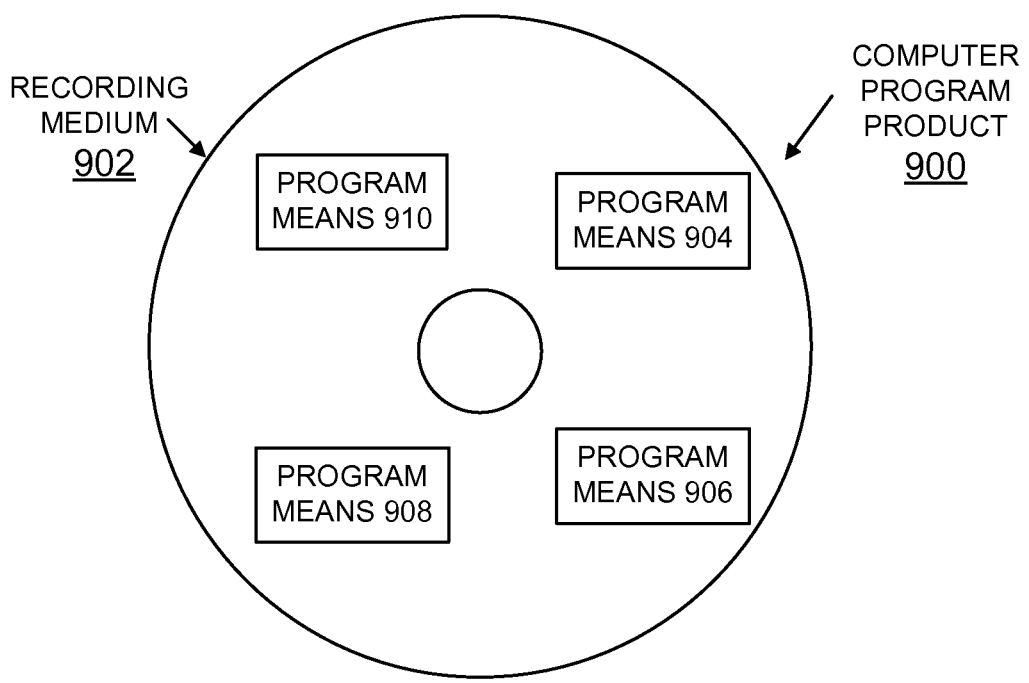
FIG. 9 is a block diagram illustrating a computer program product in accordance with the preferred embodiment.

Referring now to FIG. 9, an article of manufacture or a computer program product 900 of the invention is illustrated. The computer program product 900 is tangibly embodied on a non-transitory computer readable storage medium that includes a recording medium 902, such as, a floppy disk, a high capacity read only memory in the form of an optically read compact disk or CD-ROM, a tape, or another similar computer program product. Recording medium 902 stores program means 904, 906, 908, and 910 on the medium 902 for carrying out the methods for implementing coherent accelerator function isolation for virtualization in an input/output (IO) adapter 130, 230 of preferred embodiments in the system 100 of FIG. 1, or system 200 of FIG. 2.

A sequence of program instructions or a logical assembly of one or more interrelated modules defined by the recorded program means 909, 906, 908, and 910, direct the computer system 900 for implementing coherent accelerator function isolation for virtualization in an input/output (IO) adapter 130, 230 of preferred embodiments.

While the present invention has been described with reference to the details of the embodiments of the invention shown in the drawing, these details are not intended to limit the scope of the invention as claimed in the appended claims.

What is claimed is:

1. A method for implementing coherent accelerator function isolation for virtualization in an input/output (IO) adapter in a computer system, said computer system including a processor; and a hypervisor managing functions associated with the hardware I/O adapter; said method comprising:

providing the I/O adapter with a coherent accelerator including an interface services layer providing Partitionable Endpoint (PE) functions and multiple accelerator function units (AFUs);

enabling each AFU to operate independently of the other AFUs to perform a computing task;

enabling each AFU to access system memory bound to an application and to make one or more copies of said system memory bound to the application within the AFU;

enabling each AFU to maintain synchronization between AFU memory-cache and processor memory-cache;

providing a Peripheral Component Interconnect Express (PCIE) host bridge (PHB) for coherent accelerator PE (Partitionable Endpoint) support, said PCIE host bridge (PHB) interconnecting said AFU and a processor and memory; and providing an adapter PE, AFU PE and isolation facilities included in said PCIE host bridge (PHB).

2. The method as recited in claim 1, includes providing said adapter PE, a plurality of said AFU PEs and said isolation facilities included in said PCIE host bridge (PHB).

3. The method as recited in claim 2, includes associating each of said multiple accelerator function units (AFUs) with a respective PCIE requester ID (RID).

4. The method as recited in claim 3, includes using PCIE memory read/write operations between the processor and each said AFU with said respective PCIE requester ID (RID) identifying said respective AFU during the PCIE memory read/write operations.

5. The method as recited in claim 1, wherein the application is running within an Operating System (OS) and wherein the method includes exchanging requests to perform a task and result of completing that task between the application running within the Operating System (OS) and the AFU using command/response queues within one of system memory and the AFU or within both the system memory and the AFU.

6. The method as recited in claim 1, wherein said hypervisor associates AFUs with Peripheral Component Interconnect Express (PCIE) host bridge (PHB) isolation facilities in support of a PCIE interface.

7. The method as recited in claim 6, wherein said hypervisor detects and recovers error involving the interface services layer or AFUs, without requiring the termination of any operating system (OS) to restore operation of the respective AFU.

8. The method as recited in claim 7, includes said AFUs sharing a common PCIE Services Layer (PSL) endpoint function of the interface services layer.

9. The method as recited in claim 1, includes enabling individual ones of said AFUs to operate as PCIE endpoint functions, and using a PCIE root port to associate Memory-mapped IO (MMIO) address ranges, Direct Memory Access (DMA) address ranges, and Message Signaled Interrupt (MSI) address ranges with PCIE requester IDs (RIDs) to associate address ranges with individual said accelerator function unit (AFU).

* * * * *